US008045470B2

(12) United States Patent
Zseby

(10) Patent No.: US 8,045,470 B2
(45) Date of Patent: Oct. 25, 2011

(54) METHOD AND MONITORING SYSTEM FOR SAMPLE-ANALYSIS OF DATA COMPRISING A MULTITUTE OF DATA PACKETS

(75) Inventor: Tanja Zseby, Berlin (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 414 days.

(21) Appl. No.: 11/921,367

(22) PCT Filed: May 19, 2006

(86) PCT No.: PCT/EP2006/004953
§ 371 (c)(1),
(2), (4) Date: Oct. 8, 2008

(87) PCT Pub. No.: WO2006/128625
PCT Pub. Date: Dec. 7, 2006

(65) Prior Publication Data
US 2009/0232012 A1 Sep. 17, 2009

(30) Foreign Application Priority Data
Jun. 3, 2005 (EP) ...................................... 05076339

(51) Int. Cl.
*H04L 12/26* (2006.01)
(52) U.S. Cl. ........ 370/235; 370/230; 370/231; 370/232; 370/252; 370/253; 709/224; 709/232; 709/233; 709/234; 709/235
(58) Field of Classification Search .......... 370/230–232, 370/235, 252, 253; 709/224, 232–235
See application file for complete search history.

(56) References Cited

U.S. PATENT DOCUMENTS
2008/0043636 A1* 2/2008 Duffield et al. ............... 370/252

OTHER PUBLICATIONS

Djokic et al., Parallel Algorithms for Generating Subsets and Set Partitions, 1990, Springer-Verlag.*

(Continued)

*Primary Examiner* — Aung S Moe
*Assistant Examiner* — Hoon J Chung
(74) *Attorney, Agent, or Firm* — The Webb Law Firm

(57) ABSTRACT

The invention is related to a method and a monitoring system for sample-analysis of data comprising a multitude of data packets. Defined parent population numbers (N) of data packets are sampled by an out of N sampling and classified or vice versa. Classification is done by classification rules to create sample-flow-groups of specific flows. Each sample-flow-group consists of a sample-flow-quantity of data packets having a sample-flow-size. According to the invention in each sample-flow-group sample-flow-variances and sample-flow ratios defined by the sample-flow-quantity in proportion to the sample number (n) are determined. Furthermore, an estimated flow size defined by an estimated sum of data sizes of data packages in a flow of the parent population number of data packets and its variance are calculated. For the calculation the parent population number, the sample number and at least one of the sample-flow-ratios, the sample-flow-mean-sizes and the sample-flow-variances are used, comprising the step of determination of at least one of parent population flow-ratios parent population flow-mean-sizes and parent population flow-variances for each flow in the parent population number of data packets.

24 Claims, 9 Drawing Sheets

OTHER PUBLICATIONS

Peter Phaal, Sonia Panchen, "Packet Sampling Basics," Internet citation, 2002, pp. 1-5, URL:http://www.sflow.org/packetSamplingBasics/index.htm.

Baek-Young Choi, Jaesung Park, Zhi-Li Zhang, "Adaptive Packet Sampling for Flow Volume Measurement," Internet citation, Dec. 12, 2002, pp. 1-20, URL:http://www.cs.umn.edu/tech_reports_upload/tr2002/02-040.pdf.

Baek-Young Choi, Supratik Bhattacharayya, "On the Accuracy and Overhead of Cisco Sampled NetFlow." Sprint Atl Research Report RR04-ATL-073103, Jul. 31, 2004, pp. 1-11.

Cisco Sytems, Inc, "Using Netflow Filtering or Sampling to Select the Network Traffic to Track," Internet citation, May 2, 2005,pp. 1-24, URL:http:www.//cisco.com/univercd/cc/td/doc/product/software/ios124/124cg/hnf_c/ch05/nfb_bsmf.pdf.

Cisco Systems, Inc, "Configuring NetFlow to Capture and Export Network Traffic Data," Internet Citation, May 2, 2005, pp. 1-11, URL: http://64.233.183.104/search?q=cache:K2b0ezfq6ewJ:www.cisco.com/univercd/cc/td/doc/product/software/ios124/124/cg/hnf_c/ch05/nfb_bcf.htm.

Nick Duffield, Carsten Lund, "Predicting Resource Usage and Estimation Accuracy in an IP Flow Measurement Collection Infrastructure." Internet Citation, Oct. 27, 2003, pp. 1-13, URL:http://citeseer.ist.psu.edu/cache/papers/cs/31026/http:zSzzSzwww.icir.orgzSvernzSzimc-2003zSzpaperszSzp313-duffield-lund.pdf/duffield03predicting.pdf.

Nick Duffield, Carsten Lund, Mikkel Thorup, "Properties and Prediction of Flow Statistics from Sampled Packet Streams," ACM SIGCOMM Internet Measurement Workshop 2002, Nov. 6-8, 2002, pp. 1-13, Marseille, France.

Kimberly C. Claffy, George C. Polyzos, Hans-Werner Braun, "Application of Sampling Methodologies to Network Traffic Characterization," Proceedings of ACM SIGCOMM '93, Sep. 13-17, 1993, pp. 194-203, San Francisco, CA.

Baek-Young Choi, Jaesung Park, Zhi-Li Zhang, "Adaptive Random Sampling for Load Change Detection,"ACM SIGMETRICS 2002, Jun. 15-19, 2002, pp. 1-21, Marina Del Rey, CA. (Includes extended abstract).

Paul D. Amer, Lilian N. Cassel, "Management of Sampled Real-Time Network Measurements," 14th Conference on Local Computer Networks, Oct. 1989, pp. 62-68, Minneapolis, MN.

Marek Fisz, "Probability Theory and Mathematical Statistics," Third Edition, 1963, pp. 169-170, Robert E. Krieger Publishing Company Inc., Malabar, FL.

Duffield et al., "Trajectory Sampling for Direct Traffic Observation", AT&T Labs—Research, pp. 1-14, 2001.

Duffield et al., "A Framework For Passive Packet Measurement", Internet Citation [Online], Nov. (2002), draft-ietf-psamp-framework-01.txt, http://www.ietf.org/ietf/lid-abstracts.txt, pp. 1-21.

Kodialam et al., "Runs bAsed Traffic Estimator (RATE): A Simple, Memory Efficient Scheme for Per-Flow Rate Estimation", IEEE INFOCOM, (2004).

* cited by examiner

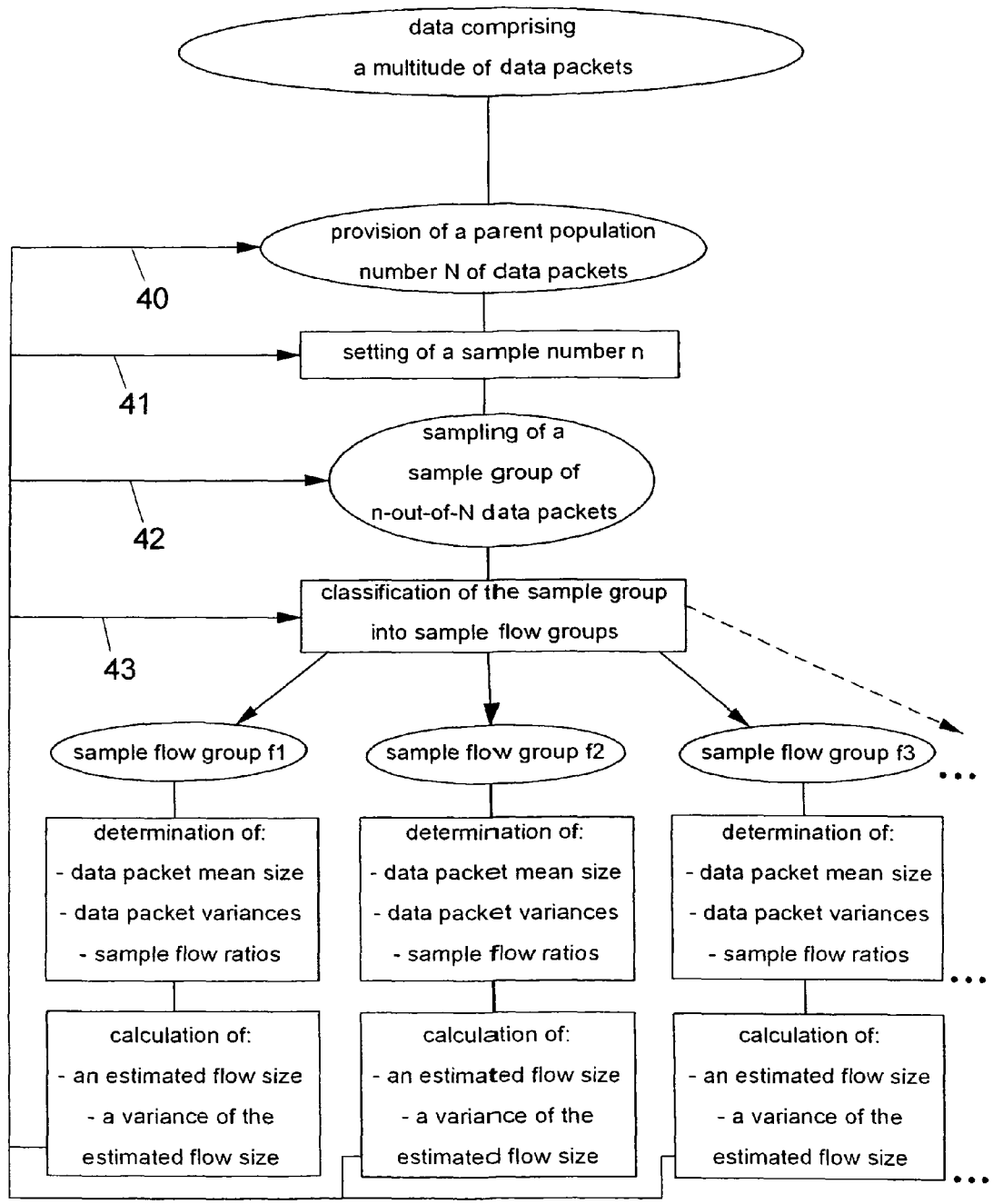

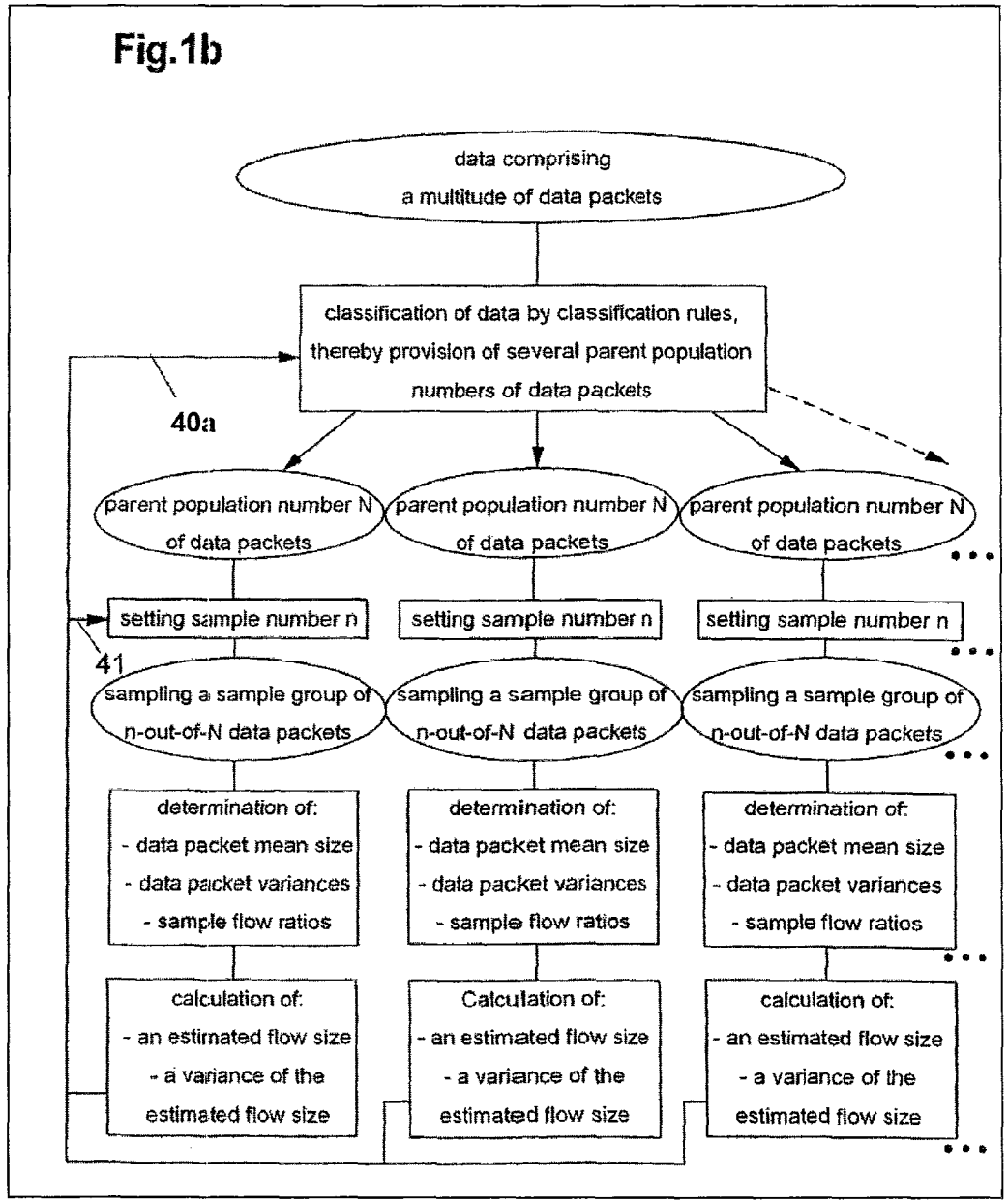

METHOD AND MONITORING SYSTEM FOR SAMPLE-ANALYSIS OF DATA COMPRISING A MULTITUTE OF DATA PACKETS

BACKGROUND OF THE INVENTION

1) Field of the Invention

The invention is related to a method for sample-analysis of data comprising a multitude of data packets showing the steps according to the body of claim 1 and claim 2 respectively. Furthermore, the invention is related to a monitoring system for sample-analysis of data comprising a multitude of data packets showing the features according to the body of claim 14.

2) Description of the Prior Art

In order to monitor data, in particular data streams (traffic) in Internet Protocol (IP) networks, a number of methods and devices are known in the art. An increasing data rate of the data stream necessarily leads to higher computing power required to analyze the single data packets of the stream. Therefore, a number of methods propose not to analyze each data packet but to apply sampling to a data stream for the measurements in IP networks.

Such a sampling method has been described for instance by Nick Duffield et al. in "Properties and Prediction of Flow Statistics from Sampled Packet Streams", ACM SIGCOMM Internet Measurement Workshop 2002, Marseille, France, Nov. 6-8, 2002. Calculation rules for probabilistic sampling and for estimating the overall volume are introduced. Nevertheless, the problem in this situation is that the sampling method is applied on the traffic mix (e.g. all traffic that is observed on an interface), but the estimation accuracy is required per 'flow'. Furthermore, the results for volume measurements of the aforementioned article apply to probabilistic and not to so-called n-out-of-N sampling.

Several definitions of the term 'flow' exist. Within the scope of the instant invention a definition following the IETF (Internet Engineering Task Force) RfC 3917 (Request for Comments) is relevant:

Data packets belonging to a particular flow have a set of common properties. Each property is defined as the result of applying a function to at least on of the values of:

1. one or more packet header fields (e.g., protocol, destination address, source address, Type of Service (TOS) in IP data packets), transport header field (e.g., destination port number, source port number), or application header field (e.g., Real-time Transfer Protocol (RTP) header fields);
2. one or more characteristics of the packet itself (e.g., number of Multi Protocol Label Switching (MPLS) labels, etc.) and
3. one or more of fields derived from packet treatment (e.g., next hop address, the output interface, etc.)

A packet is defined to belong to a particular flow if it completely satisfies all the defined properties of the flow.

For the simplest case the function being applied to the values of the properties given above is a multiplication with the factor one. However, every kind of mathematical function being suitable for the values of the given properties may be applied instead.

This definition of a flow covers the range from a flow containing all packets observed for example at a network interface to a flow consisting of just a single packet between two applications.

It is emphasized that the flow definition does not necessarily match a general application-level end-to-end stream. However, an application may derive properties of application-level streams by processing measured flow data. Furthermore, although packet properties may depend on application headers, no requirement related to application headers is defined.

In the following it is described how further important terminology is to be understood within the scope of the instant invention.

Observation Point:

An observation point is a location in a network where data packets can be observed. Examples are a line to which a probe is attached, a shared medium in particular such as an Ethernet-based LAN (Local Area Network), a single port of a router, or a set of interfaces (physical or logical) of a router.

It is emphasized that one observation point may be a superset of several other observation points. For example one observation point can be an entire line card. This would be the superset of the individual observation points at the line card's interfaces.

Flow Record:

A flow record contains information about a specific flow that was metered at an observation point. A flow record contains measured properties of the flow (e.g., the total number of bytes of all packets of the flow) and usually characteristic properties of the flow (e.g., source, in particular IP, address).

Metering:

The metering process generates flow records. Input to the process are packet headers observed at an observation point and packet treatment at the observation point, for example the selected output interface. The metering process consists of a set of functions that comprise packet header capturing, time stamping, sampling, classifying, and maintaining flow records.

The maintenance of flow records may include creating new records, updating existing ones, computing flow statistics, deriving further flow properties, detecting flow termination, passing flow records to the exporting process, and deleting flow records.

In the following a number of exemplary applications are described for the benefit of which information on different flows of the data is necessary.

Traffic Profiling:

Traffic profiling is the process of characterizing flows in particular in IP-networks by using a model that represents key parameters of the flows such as flow duration, volume, time, and burstiness. It is a prerequisite for network planning, network dimensioning and other activities. It depends heavily on the particular traffic profiling objective(s), which statistics, and which accuracy are required from the measurements. Typical information needed for traffic profiling is the distribution of used services and protocols in the network, the amount of packets of a specific type and specific flow profiles.

Since objectives for traffic profiling can vary, this application requires a high flexibility of the measurement infrastructure, especially regarding the options for measurement configuration and packet classification.

Traffic Engineering:

Traffic Engineering (TE) comprises methods for measurement, modeling, characterization and control of a network. The goal of TE is the optimization of network resource utilization and traffic performance. Since control and administrative reaction to measurement results requires access to the involved network nodes, TE mechanisms and the required measurement function usually are performed within one administrative domain. Typical parameters required for TE are link utilization, load between specific network nodes, number, size and entry/exit points of the active flows and routing information.

Attack/Intrusion Detection:

Capturing flow information plays an important role for network security, both for detection of security violation, and for subsequent defense. In case of a Denial of Service (DOS) attack, flow monitoring can allow detection of unusual situations or suspicious flows. In a second step, flow analysis can be performed in order to gather information about the attacking flows, and for deriving a defense strategy.

Intrusion detection is a potentially more demanding application which would not only look at specific characteristics of flows, but may also use a stateful packet flow analysis for detecting specific, suspicious activities, or unusually frequent activities. Such activities may be characterized by specific communication patterns, detectable by characteristic sequences of certain packet types.

QoS Monitoring:

Quality of Service (QoS) monitoring is the passive measurement of quality parameters in particular for IP flows. In contrast to active measurements, passive measurements utilize the existing traffic in the network for QoS analysis. Since no test traffic is sent, passive measurements can only be applied in situations where the traffic of interest is already present in the network. One example application is the validation of QoS parameters negotiated in a service level specification. Note that passive/active measurement is also referred to as non-intrusive/intrusive measurement or as measurement of observed/synthetic traffic.

Passive measurements cannot provide the kind of controllable experiments that can be achieved with active measurements. On the other hand passive measurements do not suffer from undesired side effects caused by sending test traffic (e.g., additional load, potential differences in treatment of test traffic and real customer traffic).

QoS monitoring often requires the correlation of data from multiple observation points (e.g., for measuring one-way metrics). This requires proper clock synchronization of the involved metering processes. For some measurements, flow records and/or notifications on specific events at the different observation points must be correlated, for example the arrival of a certain packet. For this, the provisioning of post-processing functions (e.g., the generation of packet IDs) at the metering processes would be useful. Since QoS monitoring can lead to a huge amount of measurement result data, it highly benefits from mechanisms to reduce the measurement data, like aggregation of results and sampling.

On the market there are systems available (e.g. NetFlow of Cisco™ Systems) that in particular perform methods of sample-analysis of data comprising a multitude of data packets. In a first step a parent population number of data packets represented by a defined number of data packets from the data is provided. Simultaneously or afterwards a sample number is set, wherein then a sample group comprising the sample number of data packets is sampled from the parent population number of data packets. Usually, this is done by random sampling. The sample group of data packets is classified by classification rules into sample-flow-groups representing different flows. These classification rules divide the parent population number of data packets by at least one of the foregoing properties that may characterize specific flows. Each sample-flow-group then consists of a sample-flow-quantity of data packets. Finally, sample-flow-mean-sizes defined by the mean data size of the data packets in each sample-flow-group are determined.

The described first situation, showing a first step of sampling and after this the step of classification is not compelling.

A second situation is conceivable, showing a first step of classification of all data packets of the data by classification rules into at least one parent population flow group. The quantity of generated parent population flow groups depend on the parameters of the classification rules as described above. Each of these parent population flow groups represent a particular parent population number of data packets belonging to a particular flow. Simultaneously or afterwards, for each parent population number of data packets a particular sample number is set. Using the respective sampling number, from each parent population number of data packets a sample-flow-group of data packets is sampled. Each sample-flow-group consists of a sample-flow-quantity of data packets that is equal to the respective sample number. Finally, sample-flow-mean-sizes defined by the mean data size of the data packets in each sample-flow-group are determined.

The outcome of the step of classification for the first situation and the step of sampling for the second situation is one entry per flow in the so-called flow cache. Furthermore, this entry is registered in the corresponding flow record. This entry comprises the value of the fields used to distinguish different flows (flowspec) and the total number of packets and bytes for the sampled flow. The values known to the user are only those available after the classification process. That means only the summary per flow (number of packets and bytes) is known. The individual characteristics per packet (bytes $x_i$ per packet i) are not known any longer at this stage. As n-out-of-N sampling is applied to the data that are in particular represented by a traffic mix in a data network, the data of the generated sample-flow-groups may be used to estimate the volumes of the flow groups in the parent population number of data packets (parent population flow groups).

Nevertheless, it is desirable that the user gets as much information as possible on the properties of the one or of the plurality of flow groups in the parent population flow groups.

SUMMARY OF THE INVENTION

Therefore, it is the object of this invention to provide a method for a sample-analysis of data comprising a multitude of data packets, that offers a maximum of information on the parent population flow groups, wherein being easy to perform.

Regarding the first situation, this object is achieved by a method showing the steps of claim 1. Regarding the second situation, this object is achieved by a method showing the steps of claim 2.

According to the invention for the first and second situation the respective method is characterized by the steps of determination of sample-flow-variances defined by the variance of the data size of the data packets in each sample-flow-group, determination of sample-flow-ratios defined by the sample-flow-quantity in proportion to the sample number, calculation of an estimated flow size defined by an estimated sum of data sizes of data packages in a flow of the parent population number of data packets and calculation of a variance of the estimated flow size. Wherein for the calculation steps the parent population number, the sample number and at least one of the sample-flow-ratios the sample-flow-mean-sizes and the sample-flow-variances are used, comprising the step of determination at least one of parent population flow-ratios, parent population flow-mean-sizes and parent population flow-variances for each flow in the parent population number of data packets.

Thereby, the invention allows the calculation of the expected estimation accuracy of the flow volume for each parent population flow group.

If implemented in a network device, in particular a router or a measurement device, the method can be also used to adjust sampling parameters (at least one of parent population number, sample number and classification rules) in a way to control the estimation accuracy, e.g. to obtain a (more) stable estimation accuracy.

Within the scope of claim 1 the steps of determination of the sample-flow-mean-sizes, the sample-flow-variances and the sample-flow-ratios comprise one of
- calculation using the sampled and classified data packets,
- prediction by using appropriate values of comparable data and
- using given values.

It is conceivable that the data comprising a multitude of data packets comes from data traffic of which it is known that the data packets of at least one flow do essentially not vary in size.

Furthermore, it may be of interest to analyze the calculated estimated flow sizes and its accuracies by the use of a set of given values for the previous parameters. This might be favorable when performing the instant invention unlike real-time monitoring of network data streams in a static situation investigating the impact of parameter values on the calculated flow sizes.

Accordingly, it is preferred that each step of determination of the parent population flow-ratios, the parent population flow-mean-sizes and the parent population flow-variances comprise one of
- estimation, in particular extrapolation, using at least one of the respective sample-flow-ratios, the respective sample-flow-mean-sizes and the respective sample-flow-variances,
- prediction by using appropriate values of comparable data and
- using given values.

It is conceivable that the data comprising a multitude of data packets is received from data traffic of which it is known that at least one of parent population flow-ratios, parent population flow-mean-sizes and parent population flow-variances do essentially not vary within time. Thereby, for the appropriate values in the parent population these known values may be used without need of extrapolation calculations or predictions.

It is preferred that the estimated flow size is defined by $$Sum_f = N_f \cdot M_f$$
$$= N \cdot p_f \cdot \mu_f$$
$$= N \cdot \frac{n_f}{n} \cdot \frac{1}{n_f} \cdot \sum_{i=1}^{n_f} x_{f,i}$$
$$= \frac{N}{n} \cdot \sum_{i=1}^{n_f} x_{f,i}$$

and
$N_f$ denotes a determined number of data packets belonging to one flow f in the parent population number of data packets,
$M_f$ denotes the determined parent population flow-mean-sizes,
$\mu_f$ denotes the determined sample-flow-mean-sizes,
$N$ denotes the parent population number,
$p_f$ denotes the determined sample-flow-ratios,
$n$ denotes the sample number,
$n_f$ denotes the sample-flow-quantities and
$x_f$ denotes the data size of a data packet belonging to one sample-flow-group f of the sample-flow-groups.

Furthermore, the variance ($V[Sum_f]$) of the estimated flow size ($Sum_f$) is calculated by $$V[Sum_f] = \frac{N^2}{n} \cdot ((V_f + M_f^2) \cdot P_f - M_f^2 \cdot P_f^2)$$

and
$V_f$ corresponds to the determined parent population flow-variances and
$P_f$ denotes the determined parent population flow-ratios.

In order to perform the previous calculations it is preferred that for each sample-flow-group a sample-flow-size defined by the sum of bytes of the sample-flow-quantity of data packets and a sample-square-sum of the sample-flow-size, defined by summing up the respective squares of bytes of the sample-flow-quantity of data packets, is calculated stored and updated. For this purpose this information on each flow is stored and updated in a respective flowrecord that exist for each sample-flow-group.

The sample-flow-size and the sample-square-sum of the flow size are advantageously used to calculate the parent population flow-variances using in the formula $$V_f = \frac{1}{n_f} sq_f - \frac{1}{n_f^2} s_f^2$$

wherein
$n_f$ denotes the sample-flow-quantities of data packets of a flow,
$s_f$ denotes the sample-flow-size of a flow and
$sq_f$ denotes the sample-square-sum of the flow size.

Preferably, the step of sampling comprises the step of subdividing the parent population number of data packets into a subinterval number of subintervals having a subinterval size and comprises the step of random selection of a subinterval sample number of data packets from each subinterval. For subsequent calculation it is advantageous, if the parent population number is an integer multiple of the subinterval size.

Furthermore, it is preferred that for the step of random selection a selection-number of random numbers is generated wherein the selection-number is a prime number.

The instant invention allows to use the calculated accuracy of the flow size, namely the variance of the estimated flow size, as a control parameter for a feed-back-loop. Thereby, a desired variance value of the variance of the estimated flow size is compared to the calculated variance of the estimated flow size and at least one of the parent population number, the sample number and the classification rules are controlled in such a way that the calculated variance of the estimated flow size corresponds to the desired variance of the estimated flow size.

A special case situation is given, if the parent population number of data packets all belong to a single flow. This is compelling for the second situation of analysis situations as described above. For the first situation this may be the case when at least one of the following requirements is met:
- the flow definition is so broad that all data packets match the respective classification rule and
- the data packets are identical with each other in respect to the respective classification rules.

It is preferred that the sample-analyzed data is a data stream of Internet Protocol data packets. This does not limit the scope of the instant invention to data packets comprising an IP protocol. Almost any kind of data in form of data packets that are transferred from a source (address) to a destination (address) must contain information, in particular, on where the data has come from and where it shall go to. Even if no data transfer from a source to a destination is planned, data packets usually contain other information suitable for a classification of the data packets into specific flows.

Consequently, the instant invention is applicable for almost any data comprising a multitude of data packets and is not limited to the analysis of IP protocol data packets of data streams in communication networks. This is of course a preferred embodiment and will be described in the course of the specification.

Another object of the instant invention is to provide a monitoring system for a data network with a data stream comprising a multitude of data packets.

Such a monitoring system comprises
at least one input connection for the data stream,
a sampling device adapted to sample a sample group consisting of a sample number of data packets from a defined parent population number of data packets from the data stream,
a classification device adapted to classify by classification rules at least one of the sample group into at least one sample-flow-group each of a specific flow and the data stream into at least one defined parent population number of data packets each of a specific flow, wherein each sample-flow-group consists of a respective sample-flow-quantity of data packets and
a computing device adapted to calculate an estimated flow size defined by an estimated sum of data sizes of data packages in a flow of the parent population number of data packets and to calculate a variance of the estimated flow size, wherein input data for the calculation are the parent population number, the sample number and at least one of sample-flow-ratios defined by the sample-flow-quantity in proportion to the sample number, sample-flow-mean-sizes defined by the mean data size of the data packets in each sample-flow-group and sample-flow-variances defined by the variance of the data size of the data packets in each sample-flow-group, wherein at least one of parent population flow-ratios, parent population flow-mean-sizes and parent population flow-variances for each flow in the parent population number of data packets are determined.

It is preferred that the determination of at least one of parent population flow-ratios, parent population flow-mean-sizes and parent population flow-variances is achieved by one of
estimation, in particular extrapolation, by using at least one of the respective sample-flow-ratios, the respective sample-flow-mean-sizes and the respective sample-flow-variances,
prediction by using appropriate values of comparable data and
using given values.

For the different situations of data analysis that imply the different combinations of the aforementioned meaning of "determination" the comments given above regarding the method apply accordingly.

The sampling device is preferably adapted to generate random samples from defined parent population numbers of data packets.

For the calculation of the estimated flow size and for the calculation of the variance of the estimated flow size it is preferred to apply the formula given above. Therefore, the monitoring system, in particular, the calculation device are adapted to apply these formula using the input data given in connection with the according specification of the formula.

Furthermore, it is advantageous to provide the monitoring system with a control-loop to control the calculated variance of the estimated flow size by controlling at least one of the parent population number, the sample number and the classification rules. Thereby, the variance of the estimated flow size can be controlled within a given range that is set by a user of the network.

Finally, the instant invention provides a router or a probe for a data network comprising a monitoring system as described above.

In the following, specific embodiments of the method according to the instant invention, the application of calculating an estimated flow size and its variance from data comprising data packets, in particular from a data stream comprising a multitude of IP data packets, are described.

BRIEF DESCRIPTION OF THE DRAWINGS

FIG. 1a shows a flow diagram of a first situation analyzing data comprising data packets;

FIG. 1b shows a flow diagram of a second situation analyzing data comprising data packets;

DETAILED DESCRIPTION OF THE PREFERRED EMBODIMENTS

Figure 2:
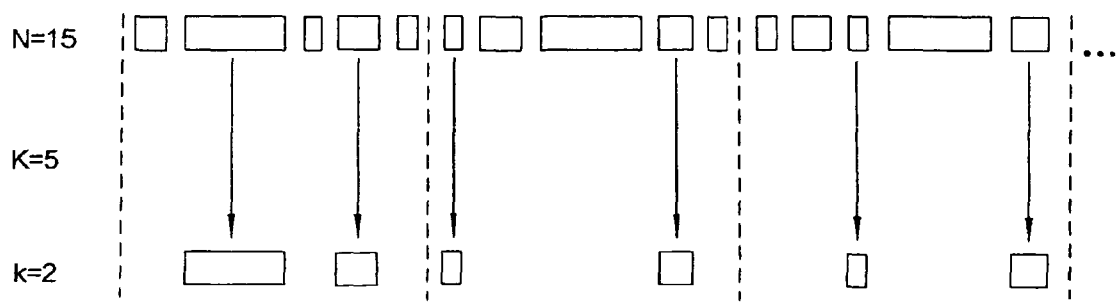
FIG. 2 shows a schematic view of a detail in a specific n-out-of-N-sampling process.

FIG. 1a shows the method steps of a first situation to analyze data comprising a multitude of data packets. This situation shows the step of n-out-of-N sampling first, followed by a classification of the sampled data packets into specific sample-flow-groups. It will be described in more detail in the following.

From the data comprising a multitude of data packets a parent population number N of data packets is provided. This step of provision may be realized by a fixed number N that is set by the user or a data monitoring system itself. In case of a data stream being analyzed it is then independent of the time that is needed until the fix number of data packets has arrived. On the other hand, it is also conceivable that the parent population number N of data packets varies. This is the case, if a fix monitoring time period is set by the user or the monitoring system in place. Then the varying parent population number N is defined by the number of data packets passing an observation point of the monitoring system within the monitoring time period.

After this, a sample number n is set either by the user by or the monitoring system itself. This sample number n is usually at least one order of magnitude smaller than the parent population number N. The value of the sample number n may vary as well. In particular it can be used as a control parameter for the whole monitoring system as it will be shown in the following.

A sampling step comprising the random sampling of the sample number of n data packets out of the parent population number of N data packets. Thereby, a sample group of data packets is provided.

Afterwards, the data packets of this sample group are classified into at least one sample-flow-group by the use of classification rules. In FIG. 1a an example with three sample-flow-groups f1, f2, f3 is shown. Each sample-flow-group f1, f2, f3 consists of a respective sample-flow-quantity nf1, nf2, nf3 of data packets.

It is obvious, that the result of the classification step might be less as well as more sample-flow-groups. The quantity of generated sample-flow-groups depends primarily on the classification rules. These rules define common properties that data packets fulfill belonging to a common flow. Regarding the parameters for these common properties and the definition of a flow being relevant for the instant invention it is referred to the corresponding paragraphs above.

For each sample-flow-group, data packet mean size (sample-flow-mean-size), data packet variances (sample-flow-variances) and sample-flow-ratios, defined by the proportion of sample-flow-quantity to sample number, is determined. One way of determination is to calculate these parameters by using the known size values of the data packets in each sample-flow-group and the sample number n and the sample-flow-quantities respectively.

It is also conceivable, that such a calculation is not necessary due to available information based on experience. It might be the case that for specific flows, the values for the mean size and its variance are very stable due to technical reasons. For-instance IP-traffic generated by voice-over-IP-systems usually shows almost identical sizes. Therefore, at least for the sample-flow-mean-sizes and for the sample flow-variances given values based on experience may be used or using these given values a prediction for the sample-flow-mean-sizes and for the sample flow-variances is possible.

Finally, an estimated flow size and its variance are calculated. For this calculation the parent population number N, the sample number n and at least one of the determined sample-flow-mean-sizes, sample-flow-variances and sample-flow-ratios are used. The estimated flow size and its variance refer to the parent population N of data packets. To calculate these values it is necessary for each specific flow determination of the data packet mean size (parent population flow-mean-size), of its variance (parent population flow-variance) and of the flow-ratio (proportion of for a specific flow in the parent population N of data packets) is necessary. The determination of these values may base on estimation, in particular extrapolation, using the respective values that have been determined for the sample flow group. On the other hand, if information based on experience is available, it is as well possible to use the information in form of given values or to predict the parent population values by use of this information.

In FIG. 1a the arrows 40, 41, 42, 43 and in FIG. 1b the arrows 40a, 41 shall illustrate that the result of the calculation in form of the estimated flow size and its variance is analyzed and may be used to control the whole process of sampling and classification. In particular, the provision of the parent population number N, the setting of the sample number n, the n-out-of-N-sampling process and the classification by classification rules show to be suitable parameters to have an effect on the calculation of the estimated flow size and its variance. Thereby, deviations from preferred values for the estimated flow size and its variance may be adjusted by at least one feed-back-loop as schematically shown in both FIG. 1a and FIG. 1b.

The estimated flow size for a specific flow f in the parent population of data packets is calculated by the following formula:

$$Sum_f = N_f \cdot M_f$$
$$= N \cdot p_f \cdot \mu_f$$
$$= N \cdot \frac{n_f}{n} \cdot \frac{1}{n_f} \cdot \sum_{i=1}^{n_f} x_{f,i}$$
$$= \frac{N}{n} \cdot \sum_{i=1}^{n_f} x_{f,i}$$

wherein $N_f$ denotes a determined number of data packets belonging to one specific flow f in the parent population number N of data packets, $M_f$ denotes the determined parent population flow-mean-size for the specific flow f, $\mu_f$ denotes the sample-flow-mean-size for the specific flow f, N denotes the parent population number N, $p_f$ denotes the determined sample-flow-ratio for the specific flow f, n denotes the sample number n, $n_f$ denotes the sample-flow-quantity for the specific flow f and $x_f$ denotes the data size of a data packet belonging to the specific sample-flow-group f1, f2, f3 . . . .

In this case for the determination of the parent population flow-mean-size Mf and for the determination of the number Nf of data packets belonging to a specific flow in the parent population (Nf=N*Pf) the simplest way is chosen. It is estimated that the sample-flow-ratio pf of data packets is equal to the corresponding ratio Pf in the parent population of data packets. Furthermore, it is estimated that the parent population flow-mean-size Mf is equal to the sample-flow-mean-size μf.

Assuming that the sample number n is small compared to the parent population number N, fulfilling the condition n<=5% of N, and that the parent population flow-ratio lies between 0.1 and 0.9 and that the sample number is large, it is possible to approximate the hyper geometrical distribution by a binomial distribution.

Thereby, the variance of the estimated flow size for a specific flow in the parent population of data packets is calculated by the following formula:

$$V[Sum_f] = \frac{N^2}{n} \cdot ((V_f + M_f^2) \cdot P_f - M_f^2 \cdot P_f^2)$$

wherein
$V_f$ corresponds to the determined parent population flow-variances and
$P_f$ denotes the determined parent population flow-ratios.

FIG. 1b shows a second situation of data analysis.

The essential difference compared to the first situation described above is that at the beginning the data comprising a multitude of data packets is classified into at least one flow by using classification rules. Thereby, at least one parent population of data packets consisting of a specific parent population number N of data packets is provided. For each of these specific parent population numbers N a specific sample number n is set. From each of the parent population number N of data packets the respective sample number n of data packets are sampled by random sampling. This is a n-out-of-N sampling as described above. The following steps the determination and calculation of values do correspond to the respective steps shown in FIG. 1a. Therefore, it is referred to the respective paragraphs of the specification above.

Due to the initial classification of the data packets it is compelling that all data packets of the parent population number of data packets belong to a common flow. Consequently, both the sample-flow-ratio pf and the parent population flow-ratio Pf are equal to one.

By this the formula for the calculation of the estimated flow size and its variance are simplified The estimated flow size for a specific flow in the parent population number is calculated by:

$$Sum_f = N_f \cdot M_f$$
$$= N \cdot \mu_f$$
$$= N \cdot \frac{1}{n_f} \cdot \sum_{i=1}^{n_f} x_{f,i}$$

and its variance by:

$$V[Sum_f] = \frac{N^2}{n} \cdot V_f$$

Schematically FIG. 2 shows a preferred embodiment of an n-out-of-N sampling procedure according to the sampling step of the description to FIG. 1a.

A parent population number N of fifteen data packets having different data sizes, represented by graphical size, is shown. In the sampling process this parent population number N is subdivided into subintervals having a subinterval size of K=5 data packets. From each of these subintervals the same sample number k=2 of data packets is randomly sampled. This type of sampling is a special form of n-out-of-N sampling. The example given in FIG. 2 is a n-out-of-N sampling procedure with n=3*k=6. Usually the sample number k is set to be one. Then it is called 1-out-of-K sampling. These kind of n-out-of-N sampling methods using subintervals are well known in the art.

In the following it will be investigated in detail, how the estimation accuracy (variance of the estimated sum) depends on traffic characteristics, flow characteristics and on sampling parameters. In order to show the dependency of the accuracy from the parameters the absolute standard error ($\sqrt{V[Sum_f]}$) and the relative standard error ($\sqrt{V[Sum_f]}/V[Sum_f]$) will be used instead of the variance because one gets the same units as for the estimated flow size and the results are more understandable.

It is emphasized that all FIGS. 3 to 7 are the results of specific parameter settings. Different parameters would lead to different results, but the general tendencies and the shape of the curves look similar. A packet proportion of Pf=12% was set in order to fulfill the assumptions given above. In most cases the proportion will be much lower.

It is easy to see from the respective formula that the variance decreases if the sample number n increases. It is quite obvious that a higher sample number n would lead to a higher accuracy. For a sample number of 0 we would get an infinite variance, which means an accuracy of 0. If the whole parent population is sampled (n=N), one would expect a variance or standard error of 0. In order to investigate how the standard error depends on the sampling fraction, the following parameter are set as fixed and a sampling fraction, which is calculated as ratio of sample number n and parent population number N, is varied:

Fixed Parameters:

| Measurement Interval length (N) | 100,000 |
| Packets from flow f in parent population (Nf) | 12,000 |
| parent population flow-mean-size (Mf) | 250 Bytes |
| parent population flow variance (Vf) | 50 Bytes |

Calculated from Parameters:

| parent population flow ratio (Pf) | 0.12 (12%) |
| Real total volume of packet from flow f in parent population | 3,000,000 Bytes |

Figure 3:
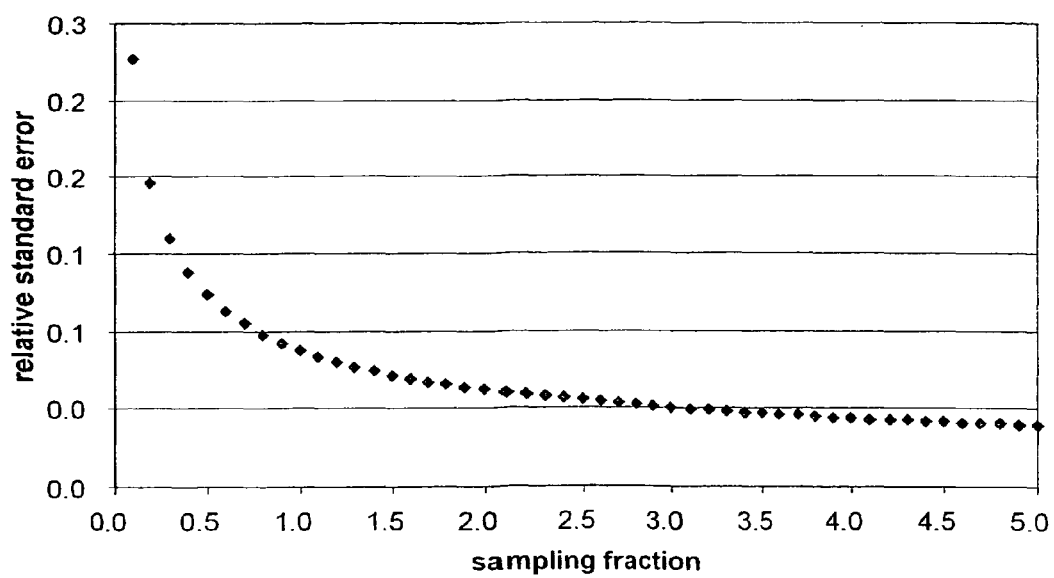
FIG. 3 shows a curve with the relative standard error (square root of the variance of the estimated flow size divided by the estimated flow size) over the sampling fraction (sample number n divided by parent population number N) as a result of a simulation calculation.

FIG. 3 shows the dependency of the relative standard error (standard error divided by real sum) of the estimated flow size from the sampling fraction for the range n/N<5%. As expected the standard error decreases for larger sampling fractions. For small sampling fractions, the standard error for the estimated flow sum is about 0.3 times of the sum itself.

Nevertheless, for sampling fractions above 5% (not shown in the figure), the standard error is only slightly decreasing. Even for a sampling fraction of 100%, which means sampling the whole parent population, one does not get the expected standard error of 0.

Indeed, if the respective formula is used for the variance of the estimated flow sum, that leads to a value for a sampling fraction of 100% that is larger than 0. The reason is that assumption n/N<=5% does not hold if n=N. The sampling fraction of 100% is much higher than 5%. Therefore, the hyper geometrical distribution cannot be approximated by a binomial distribution. So in this case the effects that occur due to the selection without replacement have to be taken into account. If packets are selected without replacement, the parent population changes with each selection. With this the selection of elements is not longer independent of the selection of other elements. So the result for n=N cannot be derived from the above formula.

The curve for the absolute standard error can be derived from FIG. 3 by simply multiplying each value in the curve with the constant real volume of the flow. Therefore, the shape of the curve would look the same.

All packets that are observed in the measurement interval form the parent population number N of data packets. For count-based n-out-of-N sampling the measurement interval length is measured in number of packets. Therefore here N also describes the measurement interval length. Increasing the measurement interval length, it has to be taken into account that other parameters depend on the parent population size N. The parameters that can depend on N are the following Sampling fraction n/N
parent population flow ratio Pf
parent population flow-mean-size Mf
parent population flow variance Vf With regard to the sampling fraction it has to be distinguished whether
a) n/N=const: The sampling fraction remains constant. That means that the number of sampled packets is increased if N is increased or
b) N=const.: The sample number n remains constant. That means the sampling fraction automatically decreases if N becomes larger.

With regard to the parent population flow ratio Pf of packets from flow f it has to be distinguished whether:
c) Pf=const: The proportion of packets from flow f remains constant. Therefore the number of packets from flow f increases with the population N. If the parent population flow-ratio Pf=const., the number of data packets belonging to flow f Nf increases as well.
d) Nf=const: The number of packets from flow f Nf remains constant. Therefore, the flow-ratio Pf has to decrease if the parent population number N increases. In this case only packets that do not belong to flow f are added to the measurement interval.

In the following the case is considered, where the sampling fraction as well as the packet proportion remains constant. That means, if the measurement interval is enlarged, the sample number n is also increased in accordance to the fixed sampling fraction and the number of packets Nf from flow f in accordance to the fixed flow-ratio Pf. It is assumed that also parent population flow-mean-size and parent population flow-variances within the flow remain the same. The following parameters are used to ensure that all assumptions hold:
Fixed Parameters:

| Sampling fraction | 5% |
| parent population flow-ratio) | 0.12 (12%) |
| parent population flow-mean-size | 250 Bytes |
| parent population flow variance | 50 Bytes |

Figure 4A:
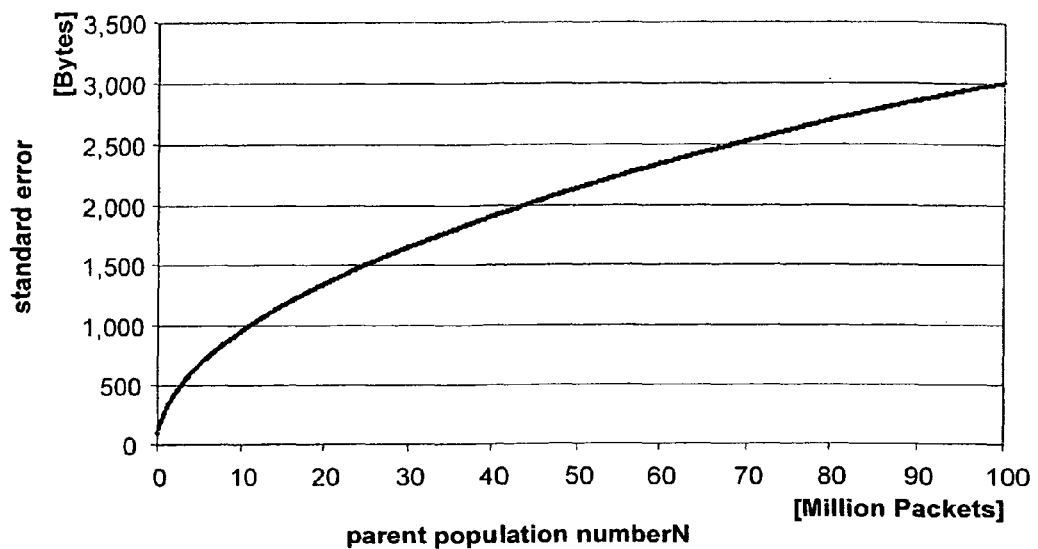
FIG. 4a shows a curve with the standard error (square root of the variance of the estimated flow size) over the parent population number N as a result of a simulation calculation.

FIG. 4a shows how the absolute standard error evolves if the measurement interval length, namely the parent population number N increases.

It would be expected that the standard error decreases (accuracy increases) if a larger parent population number is chosen and the sampling fraction and the proportion of packets from flow f remain constant. Nevertheless, as can be seen in FIG. 3a the absolute error increases. This is due to the fact that with a larger measurement interval (with fixed flow-ratio Pf) also more packets from flow f are observed and therefore also the sum of bytes from flow f increases.

Figure 4B:
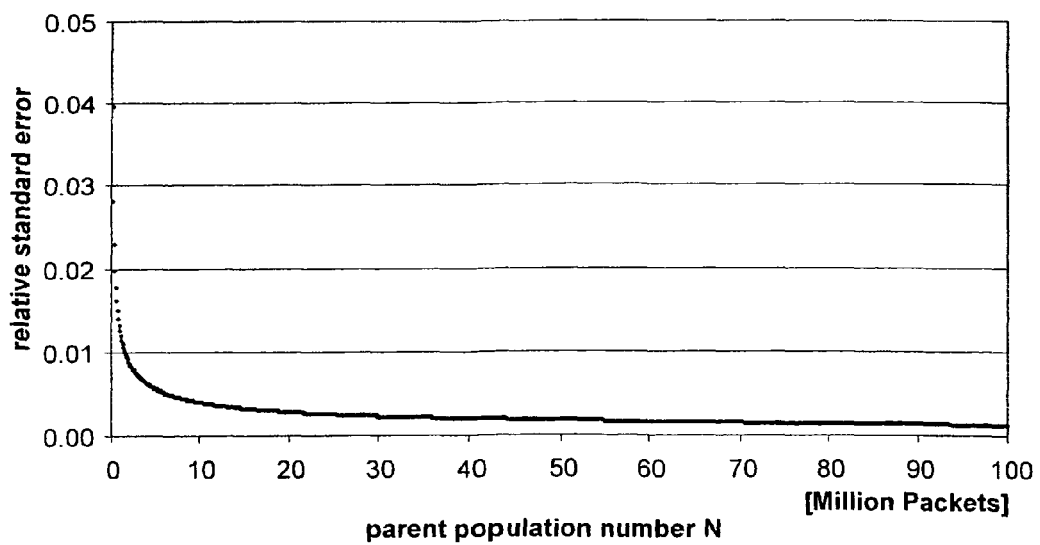
FIG. 4b shows a curve with the relative standard error over the parent population number N a result of a simulation calculation.

Regarding the relative standard error (normalized by the estimated flow size) shown in FIG. 4b the expected decrease of the error for larger parent population numbers N can be seen.

The result becomes more clear if the following is considered: If the sampling fraction remains constant, the sample number n of selected packets has to increase if the parent population number N increases. If also the proportion of packets from flow f remains constant, the number Nf of packets from flow f has to increase if parent population number N increases. Therefore, it is likely that also the sample-flow-quantity nf of packets from flow f in the sample-flow-group increases (i.e. the proportion of packets from flow f in the sample remains more or less equal). With a higher number of packets from flow f in the sample, a higher estimation accuracy can be expected.

Now the influence of the parent population sample-ratio Pf of packets from flow f to the estimation accuracy shall be examined. The sample-ratio Pf can take values between 0 and 1.

In the formula for the variance $$V[Sum_f] = \frac{N^2}{n} \cdot ((V_f + M_f^2) \cdot P_f - M_f^2 \cdot P_f^2)$$

two components can be identified:

The first component $(V_f + M_f^2) \cdot P_f$ expresses a linear relation between the variance $V[Sum_f]$ of the estimated flow size and the flow-ratio Pf. The second component $M_f^2 \cdot P_f^2$ describes a quadratic dependency. The weights of these components depend on the parent population flow-variance $V_f$ and the parent population flow-mean-size.

The case that all packets belong to flow f (Pf=1, Nf=N) leads to the following variance:

$$V[Sum_f] = \frac{N^2}{n} \cdot V_f$$

This equals exactly the variance one gets for simple random sampling of n elements from a parent population with N elements.

For the case that no packet belongs to flow f (Pf=0, Nf=0) the variance becomes 0.

In this case the maximum accuracy for the estimation (no variation of the estimated flow size) is achieved. This is obvious if the following is considered: If the flow-ratio is 0, no packet from flow f will be observed in the sample. The sample-flow-quantity nf of packets of flow f in the sample will always be 0, and with this the estimated sum always equals 0, which is a perfect estimation of the real sum.

In order to show how the accuracy depends on the flow-ratio of packets from flow f in the observed data traffic the following parameters are set as fixed:
Fixed Parameters:

| sampling fraction (n/N) | 5% |
| parent population number (N) | 100,000 |
| parent population flow-mean-size | 250 Bytes |
| parent population flow variance | 50 Bytes |

Figure 5A:
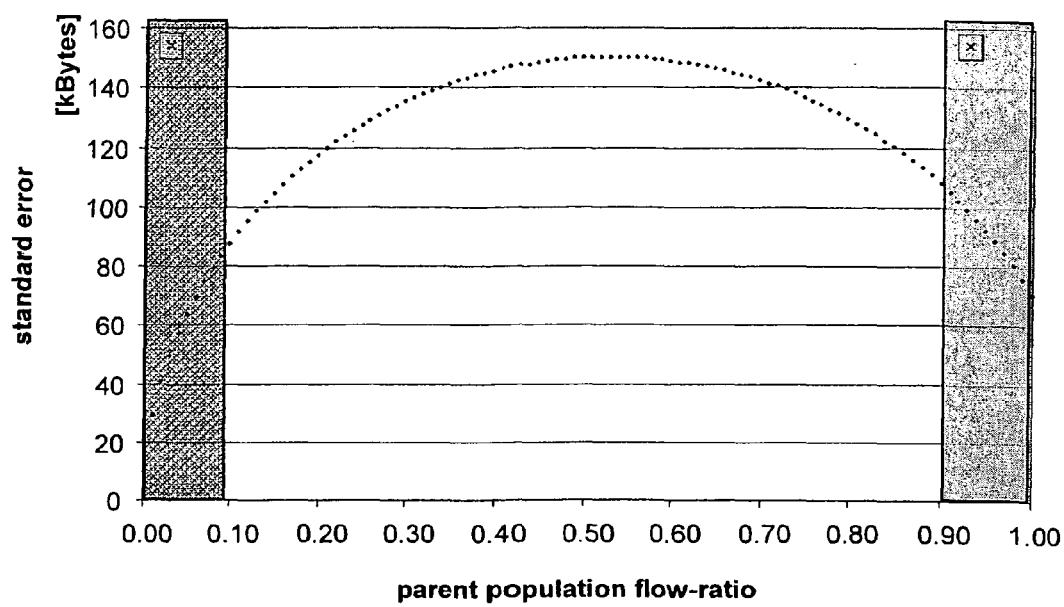
FIG. 5a shows a curve with the standard error over the parent population flow-ratio as a result of a simulation calculation.

FIG. 5*a* shows the dependency of the absolute standard error from the parent population flow-ratio of packets from flow f. In the shaded areas at least one of the assumptions does not hold. The values in these sections should be treated with care, because the formula may not be applicable in these cases. Nevertheless, for investigated data traffic the formula is also valid for much smaller packet proportions than 0.1.

As expected the standard error approaches 0 if the flow-ratio gets smaller. Furthermore, if all packets of the parent population belong to flow f (Pf=1), the expected standard error resulting is what one gets if doing an n-out-of-N random sampling on a parent population without distinguishing flows.

The standard error has its maximum if the flow-ratio of packets from flow f is 50% of the overall traffic. An explanation for this may be that the variance of the binomial distributed random variable nf (sample-flow-quantity) has its maximum if the success probability is 0.5 (which is the case for a flow-ratio of 50%).

For example 50 black balls and 50 white balls are in an urn, 10 balls are drawn as sample and from this sample the number of black balls is estimated. It is quite likely that a lot of different results are get for different sample runs. That means the estimates from the different runs would vary a lot. On the other hand if only 1 black ball and 99 white balls are in the urn and again 10 balls are drawn, the results will not vary that much. In most cases it will be 10 white balls. In a few cases 1 black ball and 9 white balls are drawn. So there are only two different estimates for the different sample runs.

So the number of packets that are get from flow f would vary most if this flow f had a flow-ratio of 0.5 of the traffic. Since the variance of the sample-flow-quantity nf is part of the formula of the variance of the estimated flow size, this leads to a higher variance (and standard error) for the volume estimation.

Calculating the relative standard error, one divides the standard error by the real volume. Therefore, it has to be taken into account that the real volume increases if the number of packets belonging to flow f Nf in the parent population increases. So the relative error depends on the absolute standard error and the increasing real volume.

Figure 5B:
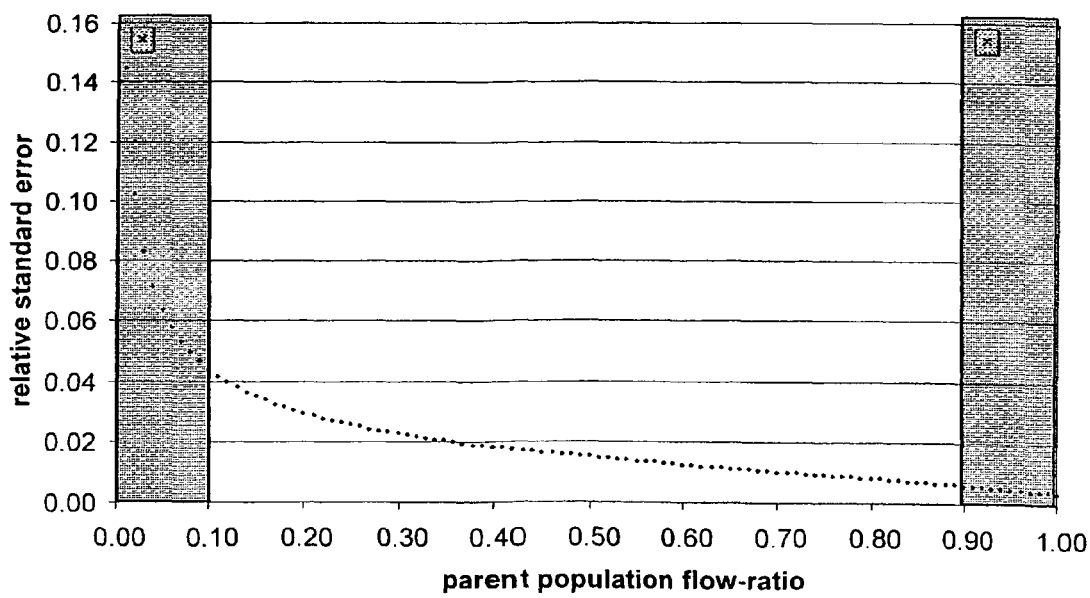
FIG. 5b shows a curve with the relative standard error over the parent population flow-ratio as a result of a simulation calculation.

FIG. 5*b* shows how the relative standard error depends on the flow-ratio. The volume increases linear with the packet proportion. So the curve for the relative error is the result of the division of the curve for the absolute error (FIG. 5*a*) by a linear function.

The variance of the estimated flow size for a flow volume depends on the mean packet size within the flow. For the representation of FIG. 6*a* the following values are fixed:
Fixed Parameters:

| sampling fraction n/N | 5% |
| parent population number N | 100,000 |
| parent population flow-ratio Pf | 0.12 (12%) |
| parent population flow variance | 50 Bytes |

Figure 6A:
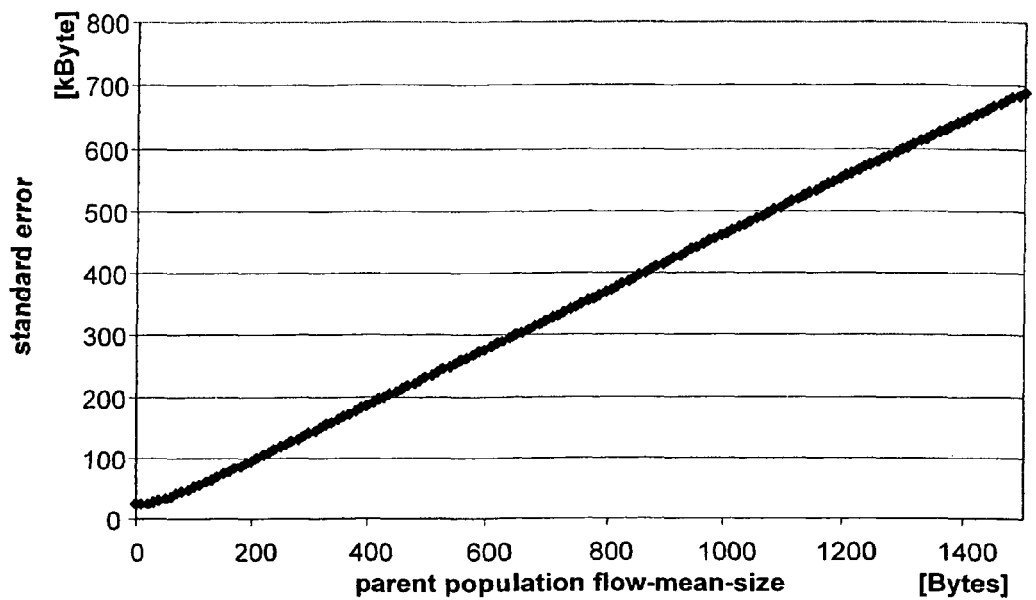
FIG. 6a shows a curve with the standard error over the parent population flow-mean-size as a result of a simulation calculation.
Figure 6B:
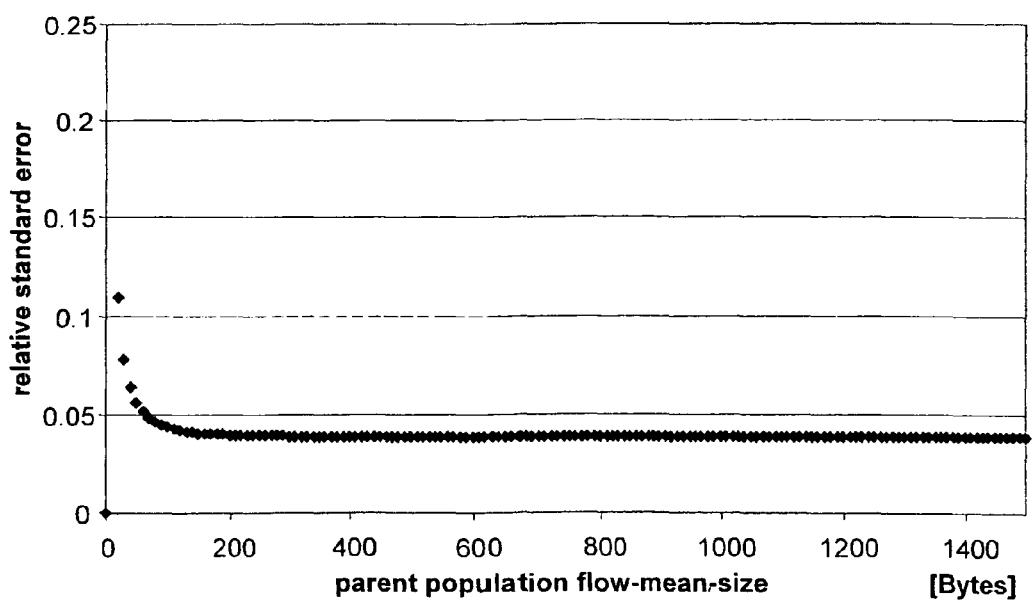
FIG. 6b shows a curve with the relative standard error over the parent population flow-mean-size as a result of a simulation calculation.
Figure 7:
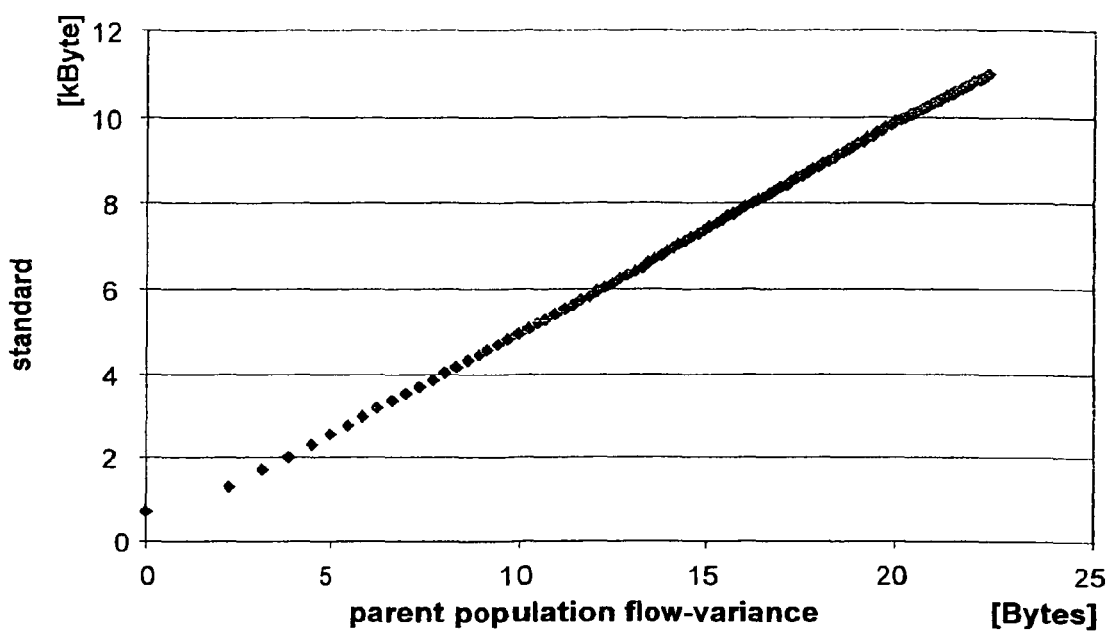
FIG. 7 shows a curve of the standard error over the parent population flow-variance as a result of a simulation calculation.

FIG. 6*a* shows how the standard error of the estimated flow size depends on the parent population flow-mean-size.

If the parent population flow-mean-size is 0 a minimum standard error of 24 kBytes is the result. This comes from the term with the variance in the formula. Nevertheless if the mean packet size was 0, all packets would have to have size 0 and therefore the variance also would be 0 (and not 50 Bytes as assumed). Therefore in reality the standard error for an observed data traffic with parent population flow-mean-size 0 would also be 0.

The curves looks nearly linear. The absolute standard error increase, because the overall volume increases and with this a larger error can be made. The formula for the variance contains the squared mean. But in order to get the standard error from this the root has to be extracted. Therefore, one does not get a squared dependency for the standard error.

In order to look at the relative error the overall volume from flow f by multiplying the parent population flow-mean-size of the flow with the number of packets from this flow is calculated (Nf=N*Pf=100,000*012=12,000).

FIG. 7*b* shows how the relative standard error depends on the parent population flow-mean-size. If the flow-ratio remains constant, the volume increases linear with the parent population flow-mean-size. So the curve for the relative error is the result of the division of the curve for the absolute error (FIG. 7*a*) by a linear function.

The variance of the estimated flow size also depends on the parent population flow variance of the packet sizes within the flow. For the representation in FIG. 8 the following values are fixed:
Fixed Parameters:

| sampling fraction n/N | 5% |
| parent population number N | 100,000 |
| parent population flow-ratio Pf | 0.12 (12%) |
| parent population flow-mean-sizes | 250 Bytes |

Figure 8:
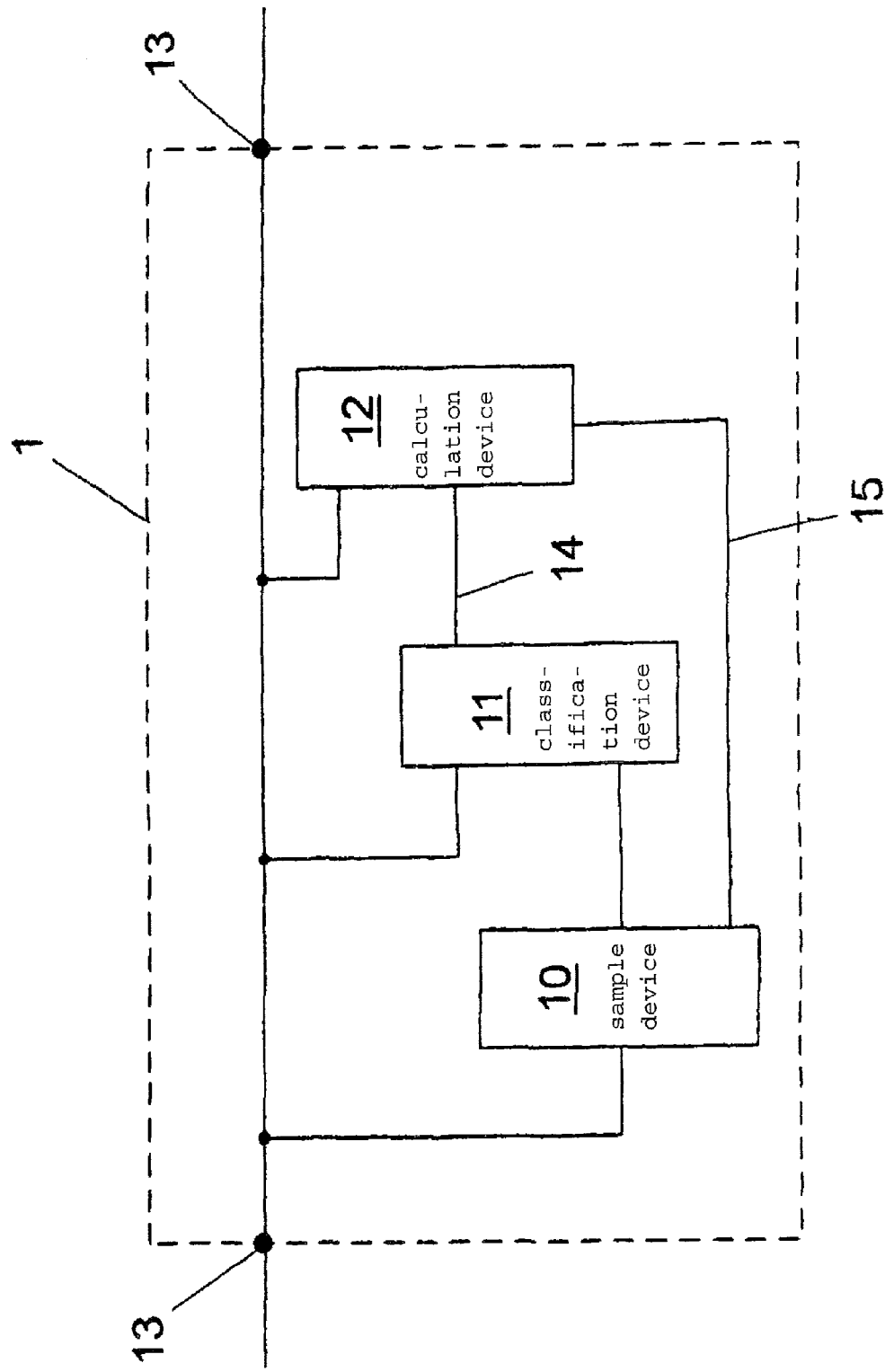
FIG. 8 shows a schematic structure of a monitoring system for a data network according to the invention and FIG. 9 shows a schematic structure of a data network with a probe and a router comprising a monitoring system according to the instant invention.

From FIG. 8 it can be seen, that for increasing parent population flow variances more different estimated flow sizes are possible. Therefore, the expected standard error increases if the parent population flow variances increase. Since the parent population flow-mean-size is set constant for this considerations, the real flow volume also would be constant. Therefore, the curve for the relative error would look the same, because the absolute error has to be divided by a constant.

Furthermore, it is an object of the instant invention to provide a monitoring system for data networks that ensures a maximum of information on the specific flows of the monitored data traffic.

The structure of such a monitoring system is shown schematically in FIG. 8. The monitoring system 1 comprises at least one input connection 13 to receive the data signals from a data network. A sampling device 10 is adapted to randomly sample a sample group of a sample number n of data packets from a defined parent population number N of data packets. This parent population number N of data packets may either be set from the data stream by the sampling device 10 or it is generated by a classification device 11 by classifying the data stream into at least one defined parent population number N of data packets, each of these parent populations showing data packets of a specific flow. Additionally or alternatively the classification device 11 may be adapted to classify by classification rules the sample group generated by the sampling device 10 into at least one group of data packets each group consisting of data packets from a specific flow. For this purpose the classification device shows preferably both a line to the sample device and to the input connection 13.

Therefore, the monitoring system 1 is adapted for at least one of the first and second situation of the methods according to the instant invention as described above.

Furthermore, the monitoring systems shows a computing device 12 adapted to calculate the estimated flow size and the respective variance. For calculation the input data are used as described above. In particular the respective formula are used.

The monitoring system 1 shows lines 14, 15 that interconnect the calculation device 12 with the sample device 10 and the classification device 11. These lines may be used to transmit a feed-back control signal. Thereby, the calculated values for the estimated flow size and its variance respectively may be controlled by controlling at least one of classification rules, parent population number N and sample number n.

Figure 9:
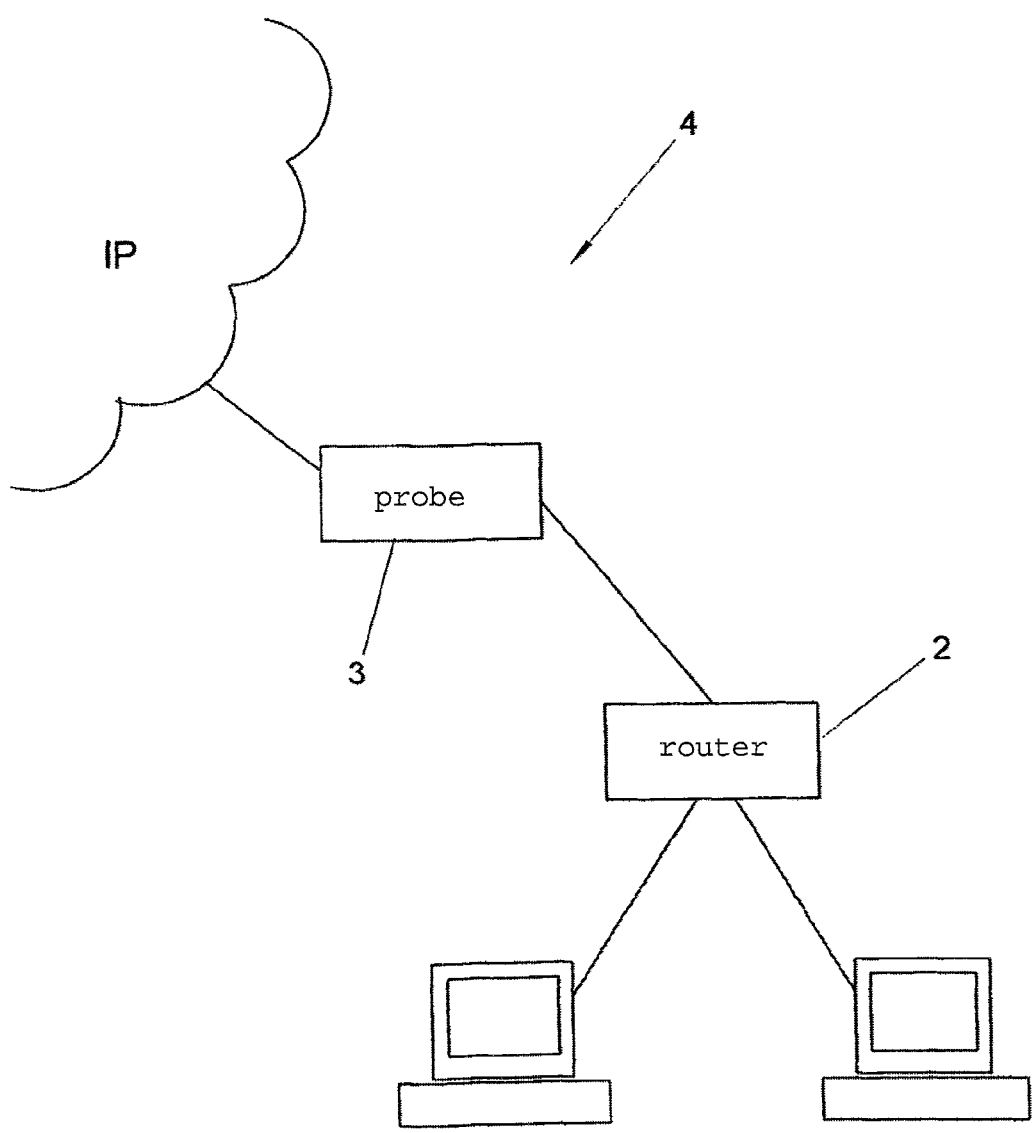

As shown in FIG. 9 it is advantageous to integrate such a monitoring system 1 in a router 2 or a probe 3 of a data network 4.

The invention claimed is:

1. A system for a sample-analysis of data comprising a multitude of data packets, the system comprising:
an input of a monitoring system receiving from a network data from which a parent population number (N) of data packets is provided,
a sampling device the monitoring system setting a sample number (n),
the sampling device sampling a sample group with the sample number (n) of data packets from the parent population number (N) of data packets,
a classification device of the monitoring system classifying the sample group by classification rules into sample-flow-groups (f1, f2, f3 . . .) representing different flows, each sample-flow-group (f1, f2, f3 . . .) consisting of a sample-flow-quantity ($n_{f1}$, $n_{f2}$, $n_{f3}$ . . .) of data packets,
a computing device of the monitoring system determining sample-flow-mean-sizes ($\mu_{f1}$, $\mu_{f2}$, $\mu_{f3}$ . . .) defined by mean data size of the data packets in each sample-flow-group (f1, f2, f3 . . .),
the computing device determining sample-flow-variances ($v_{f1}$, $v_{f2}$, $v_{f3}$ . . .) defined by a variance of data size of the data packets in each sample-flow-group (f1, f2, f3 . . .),
determining sample-flow-ratios ($p_{f1}$, $p_{f2}$, $p_{f3}$ . . .) defined by the sample-flow-quantity ($n_{f1}$, $n_{f2}$, $n_{f3}$ . . .) in proportion to the sample number (n),
the computing device calculating an estimated flow size ($Sum_f$) defined by an estimated sum of data sizes of data packages in a flow of the parent population number (N) of data packets, and
the computing device calculating a variance ($V[Sum_f]$) of the estimated flow size ($Sum_f$), wherein for the calculating steps the parent population number (N), the sample number (n) and at least one of the sample-flow-ratios ($p_{f1}$, $p_{f2}$, $p_{f3}$ . . .), the sample-flow-mean-sizes ($\mu_{f1}$, $\mu_{f2}$, $\mu_{f3}$ . . .), and the sample-flow-variances ($v_{f1}$, $v_{f2}$, $v_{f3}$ . . .) are used, comprising the step of determining at least one of parent population flow-ratios ($P_{f1}$, $P_{f2}$, $P_{f3}$ . . .), parent population flow-mean-sizes ($M_{f1}$, $M_{f2}$, $M_{f3}$ . . .), and parent population flow-variances ($V_{f1}$, $V_{f2}$, $V_{f3}$ . . .) for each flow in the parent population number (N) of data packets, wherein the estimated flow size ($Sum_f$) is defined by $$Sum_f = N_f \cdot M_f$$
$$= N \cdot p_f \cdot \mu_f$$
$$= N \cdot \frac{n_f}{n} \cdot \frac{1}{n_f} \cdot \sum_{i=1}^{n_f} x_{f,i}$$
$$= \frac{N}{n} \cdot \sum_{i=1}^{n_f} x_{f,i}$$

and
$N_f$ denotes a determined number of data packets belonging to one flow f in the parent population number (N) of data packets,
$M_f$ denotes the determined parent population flow-mean-sizes ($M_{f1}$, $M_{f2}$, $M_{f3}$ . . .),
$\mu_f$ denotes the sample-flow-mean-sizes ($\mu_{f1}$, $\mu_{f2}$, $\mu_{f3}$ . . .),
N denotes the parent population number (N),
$p_f$ denotes the sample-flow-ratios ($p_{f1}$, $p_{f2}$, $p_{f3}$ . . .),
n denotes the sample number (n),
$n_f$ denotes the sample-flow-quantities ($n_{f1}$, $n_{f2}$, $n_{f3}$ . . .) and
$x_f$ denotes the data size of a data packet belonging to one sample-flow-group of the sample-flow-groups (f1, f2, f3 . . .), and
wherein the variance ($V[Sum_f]$) of the estimated flow size ($Sum_f$) is calculated by $$V[Sum_f] = \frac{N^2}{n} \cdot ((V_f + M_f^2) \cdot P_f - M_f^2 \cdot P_f^2)$$

and
$V_f$ corresponds to the determined parent population flow-variances ($V_{f1}$, $V_{f2}$, $V_{f3}$ . . .) and
$P_f$ denotes the determined parent population flow-ratios ($P_{f1}$, $P_{f2}$, $P_{f3}$ . . .).

2. The system according to claim 1, wherein each step of determining the parent population flow-ratios ($P_{f1}$, $P_{f2}$, $P_{f3}$ . . .), the parent population flow-mean-sizes ($M_{f1}$, $M_{f2}$, $M_{f3}$ . . .) and the parent population flow-variances ($V_{f1}$, $V_{f2}$, $V_{f3}$ . . .) comprise one of:
estimating using at least one of the respective sample-flow-ratios ($p_{f1}$, $p_{f2}$, $p_{f3}$ . . .), the respective sample-flow-mean-sizes ($\mu_{f1}$, $\mu_{f2}$, $\mu_{f3}$ . . .) and the respective sample-flow-variances ($v_{f1}$, $v_{f2}$, $v_{f3}$ . . .),
predicting by using appropriate values of comparable data, and
using given values.

3. The system according to claim 1, wherein the step of sampling comprises the step of subdividing the parent population number (N) of data packets into a subinterval number (L) of subintervals having a subinterval size (K) and the step of random selection of a subinterval sample number (k) of data packets from each subinterval.

4. The system according to claim 3, wherein the parent population number (N) is an integer multiple of the subinterval size (K).

5. The system according to claim 3, wherein for the step of random selection a selection-number of random numbers is generated wherein the selection-number is a prime number.

6. The system according to claim 1, wherein a desired variance value of the variance of the estimated flow size is compared to the calculated variance ($V[Sum_f]$) of the estimated flow size and at least one of the parent population number (N), the sample number (n), and the classification rules are controlled so that the calculated variance of the estimated flow size ($V[Sum_f]$) corresponds to the desired variance of the estimated flow size.

7. The system according to claim 1, wherein the parent population number (N) of data packets all belong to at least a single flow.

8. The system according to claim 1, wherein the sample-analyzed data is a data stream of Internet Protocol data packets.

9. A system for a sample-analysis of data comprising a multitude of data packets, the system comprising:
- a classification device classifying the data by classification rules into parent population flow groups, each parent population flow group representing a particular parent population number (N) of data packets,
- a sampling device setting a particular sample number (n) for each of the particular parent population number (N) of data packets,
- the sampling device sampling sample-flow-groups (f1, f2, f3 . . .) with the corresponding sample number (n) of data packets from each of the particular parent population number (N) of data packets, wherein each sample-flow-group (f1, f2, f3 . . .) consists of a sample-flow-quantity ($n_{f1}$, $n_{f2}$, $n_{f3}$ . . .) of data packets that is equal to the respective sample number (n),
- a computing device determining sample-flow-mean-sizes ($\mu_{f1}$, $\mu_{f2}$, $\mu_{f3}$ . . .) defined by mean data size of the data packets in each sample-flow-group (f1, f2, f3 . . .),
- the computing device determining sample-flow-variances ($v_{f1}$, $v_{f2}$, $v_{f3}$ . . .) defined by a variance of data size of the data packets in each sample-flow-group (f1, f2, f3 . . .),
- determining sample-flow-ratios ($p_{f1}$, $p_{f2}$, $p_{f3}$ . . .) defined by the sample-flow-quantity ($n_{f1}$, $n_{f2}$, $n_{f3}$ . . .) in proportion to the sample number (n),
- the computing device calculating an estimated flow size ($Sum_f$) defined by an estimated sum of data sizes of data packages in a flow of a parent population number (N) of data packets, and
- the computing device calculating a variance ($V[Sum_f]$) of the estimated flow size ($Sum_f$), wherein for the calculating steps the parent population number (N), the sample number (n) and at least one of the sample-flow-ratios ($p_{f1}$, $p_{f2}$, $p_{f3}$ . . .), the sample-flow-mean-sizes ($\mu_{f1}$, $\mu_{f2}$, $\mu_{f3}$ . . .), and the sample-flow-variances ($v_{f1}$, $v_{f2}$, $v_{f3}$ . . .) are used, comprising the step of determining at least one of parent population flow-ratios ($P_{f1}$, $P_{f2}$, $P_{f3}$ . . .), parent population flow-mean-sizes ($M_{f1}$, $M_{f2}$, $M_{f3}$ . . .), and parent population flow-variances ($V_{f1}$, $V_{f2}$, $V_{f3}$ . . .) for each flow in the parent population number (N) of data packets, wherein the estimated flow size ($Sum_f$) is defined by $$Sum_f = N_f \cdot M_f$$
$$= N \cdot p_f \cdot \mu_f$$
$$= N \cdot \frac{n_f}{n} \cdot \frac{1}{n_f} \cdot \sum_{i=1}^{n_f} x_{f,i}$$
$$= \frac{N}{n} \cdot \sum_{i=1}^{n_f} x_{f,i}$$

and
- $N_f$ denotes a determined number of data packets belonging to one flow f in the parent population number (N) of data packets,
- $M_f$ denotes the determined parent population flow-mean-sizes ($M_{f1}$, $M_{f2}$, $M_{f3}$ . . .),
- $\mu_f$ denotes the sample-flow-mean-sizes ($\mu_{f1}$, $\mu_{f2}$, $\mu_{f3}$ . . .),
- N denotes the parent population number (N),
- $p_f$ denotes the sample-flow-ratios ($p_{f1}$, $p_{f2}$, $p_{f3}$ . . .),
- n denotes the sample number (n),
- $n_f$ denotes the sample-flow-quantities ($n_{f1}$, $n_{f2}$, $n_{f3}$ . . .) and
- $x_f$ denotes the data size of a data packet belonging to one sample-flow-group of the sample-flow-groups (f1, f2, f3 . . .), and wherein the variance ($V[Sum_f]$) of the estimated flow size ($Sum_f$) is calculated by $$V[Sum_f] = \frac{N^2}{n} \cdot ((V_f + M_f^2) \cdot P_f - M_f^2 \cdot P_f^2)$$

and
- $V_f$ corresponds to the determined parent population flow-variances ($V_{f1}$, $V_{f2}$, $V_{f3}$ . . .) and
- $P_f$ denotes the determined parent population flow-ratios ($P_{f1}$, $P_{f2}$, $P_{f3}$ . . .).

10. The system according to claim 9, wherein each step of the determining the parent population flow-ratios ($P_{f1}$, $P_{f2}$, $P_{f3}$ . . .), the parent population flow-mean-sizes ($M_{f1}$, $M_{f2}$, $M_{f3}$ . . .) and the parent population flow-variances ($V_{f1}$, $V_{f2}$, $V_{f3}$ . . .) comprise one of:
- estimating using at least one of the respective sample-flow-ratios ($p_{f1}$, $p_{f2}$, $p_{f3}$ . . .), the respective sample-flow-mean-sizes ($\mu_{f1}$, $\mu_{f2}$, $\mu_{f3}$ . . .) and the respective sample-flow-variances ($v_{f1}$, $v_{f2}$, $v_{f3}$ . . .),
- predicting by using appropriate values of comparable data, and
- using given values.

11. The system according to claim 9, wherein the step of sampling comprises the step of subdividing the parent population number (N) of data packets into a subinterval number (L) of subintervals having a subinterval size (K) and the step of random selection of a subinterval sample number (k) of data packets from each subinterval.

12. The system according to claim 11, wherein the parent population number (N) is an integer multiple of the subinterval size (K).

13. The system according to claim 11, wherein for the step of random selection a selection-number of random numbers is generated wherein the selection-number is a prime number.

14. The system according to claim 9, wherein a desired variance value of the variance of the estimated flow size is compared to the calculated variance ($V[Sum_f]$) of the estimated flow size and at least one of the parent population number (N), the sample number (n), and the classification rules are controlled so that the calculated variance of the estimated flow size ($V[Sum_f]$) corresponds to the desired variance of the estimated flow size.

15. The system according to claim 9, wherein the parent population number (N) of data packets all belong to a single flow.

16. The system according to claim 9, wherein the sample-analyzed data is a data stream of Internet Protocol data packets.

17. A monitoring system for a data network with a data stream comprising a multitude of data packets, wherein the monitoring system comprises:
- at least one input connection for the data stream,
- a sampling device adapted to sample a sample group consisting of a sample number (n) of data packets from a defined parent population number (N) of data packets from the data stream,
- a classification device adapted to classify, by classification rules, the sample group into at least one sample-flow-group (f1, f1, f3 . . .) each of a specific flow and the data stream being included in at least one defined parent population number (N) of data packets each of a specific flow, wherein each sample-flow-group (f1, f2, f3 . . .) consists of a respective sample-flow-quantity (nf1, nf2, nf3 . . .) of data packets, and a computing device adapted to calculate an estimated flow size ($Sum_f$) defined by an estimated sum of data sizes of data packages in a flow of the parent population number (N) of data packets and to calculate a variance ($V[Sum_f]$) of the estimated flow size ($Sum_f$), wherein input data for the calculation of the variance of the estimated flow size are the parent population number (N), the sample number (n) and at least one of sample-flow-ratios ($p_{f1}$, $p_{f2}$, $p_{f3}$ . . .) defined by the sample-flow-quantity (nf1, nf2, nf3 . . .) in proportion to the sample number (n), sample-flow-mean-sizes ($\mu_{f1}, \mu_{f2}, \mu_{f3}$ . . .) defined by mean data size of the data packets in each sample-flow-group (f1, f2, f3 . . .) and sample-flow-variances ($v_{f1}, v_{f2}, v_{f3}$ . . .) defined by a variance of data size of the data packets in each sample-flow-group (f1, f2, f3 . . .), wherein at least one of parent population flow-ratios ($P_{f1}, P_{f2}, P_{f3}$ . . .), parent population flow-mean-sizes ($M_{f1}, M_{f2}, M_{f3}$ . . .), and parent population flow-variances ($V_{f1}, V_{f2}, V_{f3}$ . . .) for each flow in the parent population number (N) of data packets are determined, wherein the estimated flow size ($Sum_f$) is defined by $$Sum_f = N_f \cdot M_f$$
$$= N \cdot p_f \cdot \mu_f$$
$$= N \cdot \frac{n_f}{n} \cdot \frac{1}{n_f} \cdot \sum_{i=1}^{n_f} x_{f,i}$$
$$= \frac{N}{n} \cdot \sum_{i=1}^{n_f} x_{f,i}$$

and
$N_f$ denotes a determined number of data packets belonging to one flow f in the parent population number (N) of data packets,
$M_f$ denotes the determined parent population flow-mean-sizes ($M_{f1}, M_{f2}, M_{f3}$ . . .),
$\mu_f$ denotes the sample-flow-mean-sizes ($\mu_{f1}, \mu_{f2}, \mu_{f3}$ . . .),
N denotes the parent population number (N),
$p_f$ denotes the sample-flow-ratios ($p_{f1}, p_{f2}, p_{f3}$ . . .),
n denotes the sample number (n),
$n_f$ denotes the sample-flow-quantities ($n_{f1}, n_{f2}, n_{f3}$ . . .) and
$x_f$ denotes the data size of a data packet belonging to one sample-flow-group of the sample-flow-groups (f1, f2, f3 . . .), and wherein the variance ($V[Sum_f]$) of the estimated flow size ($Sum_f$) is calculated by $$V[Sum_f] = \frac{N^2}{n} \cdot ((V_f + M_f^2) \cdot P_f - M_f^2 \cdot P_f^2)$$

and
$V_f$ corresponds to the determined parent population flow-variances ($V_{f1}, V_{f2}, V_{f3}$ . . .) and
$P_f$ denotes the determined parent population flow-ratios ($P_{f1}, P_{f2}, P_{f3}$ . . .).

18. The monitoring system according to claim 17, wherein the determination of at least one of parent population flow-ratios ($P_{f1}, P_{f2}, P_{f3}$ . . .), parent population flow-mean-sizes ($M_{f1}, M_{f2}, M_{f3}$ . . .), and parent population flow-variances ($V_{f1}, V_{f2}, V_{f3}$ . . .) is achieved by one of:

estimation, including extrapolation, by using at least one of the respective sample-flow-ratios ($p_{f1}, p_{f2}, p_{f3}$ . . .), the respective sample-flow-mean-sizes ($\mu_{f1}, \mu_{f2}, \mu_{f3}$ . . .) and the respective sample-flow-variances ($v_{f1}, v_{f2}, v_{f3}$ . . .), prediction by using appropriate values of comparable data, and using given values.

19. The monitoring system according to claim 17, wherein the sample device is adapted to randomly sample data packets from a defined parent population number (N) of data packets.

20. The monitoring system according to claim 17, wherein the monitoring system comprises a control-loop to control the calculated variance ($V[Sum_f]$) of the estimated flow size ($Sum_f$) by controlling at least one of the parent population number (N), the sample number (n), and the classification rules.

21. A router or a probe for a data network comprising the monitoring system according to claim 17.

22. A probe for the data network comprising the monitoring system according to claim 17.

23. A system for a sample-analysis of data comprising a multitude of data packets, the system comprising:

an input of a monitoring system receiving from a network data from which a parent population number (N) of data packets is provided, a sampling device setting a sample number (n), the sampling device sampling a sample group with the sample number (n) of data packets from the parent population number (N) of data packets, a classification device classifying the sample group by classification rules into sample-flow-groups (f1, f2, f3 . . .) representing different flows, each sample-flow-group (f1, f2, f3 . . .) consisting of a sample-flow-quantity ($n_{f1}, n_{f2}, n_{f3}$ . . .) of data packets, a computing device determining sample-flow-mean-sizes ($\mu_{f1}, \mu_{f2}, \mu_{f3}$ . . .) defined by mean data size of the data packets in each sample-flow-group (f1, f2, f3 . . .), the computing device determining sample-flow-variances ($v_{f1}, v_{f2}, v_{f3}$ . . .) defined by a variance of data size of the data packets in each sample-flow-group (f1, f2, f3 . . .), determining sample-flow-ratios ($p_{f1}, p_{f2}, p_{f3}$ . . .) defined by the sample-flow-quantity ($n_{f1}, n_{f2}, n_{f3}$ . . .) in proportion to the sample number (n), the computing device calculating an estimated flow size ($Sum_f$) defined by an estimated sum of data sizes of data packages in a flow of the parent population number (N) of data packets, and the computing device calculating a variance ($V[Sum_f]$) of the estimated flow size ($Sum_f$), wherein for the calculating steps the parent population number (N), the sample number (n) and at least one of the sample-flow-ratios ($p_{f1}, p_{f2}, p_{f3}$ . . .), the sample-flow-mean-sizes ($\mu_{f1}, \mu_{f2}, \mu_{f3}$ . . .), and the sample-flow-variances ($v_{f1}, v_{f2}, v_{f3}$ . . .) are used, comprising the step of determining at least one of parent population flow-ratios ($P_{f1}, P_{f2}, P_{f3}$ . . .), parent population flow-mean-sizes ($M_{f1}, M_{f2}, M_{f3}$ . . .), and parent population flow-variances ($V_{f1}, V_{f2}, V_{f3}$ . . .) for each flow in the parent population number (N) of data packets, wherein for each sample-flow-group (f1, f2, f3 . . .) in a further step a sample-flow-size ($s_{f1}, s_{f2}, s_{f3}$ . . .), defined by a sum of bytes of the sample-flow-quantity ($n_{f1}, n_{f2}, n_{f3}$ . . .) of data packets, and a sample-square-sum ($sq_{f1}, sq_{f2}, sq_{f3}$ . . .), defined by summing up respective squared bytes of the sample-flow-quantity ($n_{f1}$, $n_{f2}$, $n_{f3}$ . . .) of data packets, are calculated, stored and updated, and wherein the parent population flow-variances ($V_{f1}$, $V_{f2}$, $V_{f3}$ . . .) are calculated using the sample-flow-size ($s_{f1}$, $s_{f2}$, $s_{f3}$ . . .) and the sample-square-sum ($sq_{f1}$, $sq_{f2}$, $sq_{f3}$ . . .) of a flow size in the formula $$V_f = \frac{1}{n_f}sq_f - \frac{1}{n_f^2}s_f^2$$

wherein $n_f$ denotes the sample-flow-quantities ($n_{f1}$, $n_{f2}$, $n_{f3}$ . . .) of data packets of a flow, $s_f$ denotes the sample-flow-size ($s_{f1}$, $s_{f2}$, $s_{f3}$ . . .) of a flow and $sq_f$ denotes the sample-square-sum ($sq_{f1}$, $sq_{f2}$, $sq_{f3}$ . . .) of the flow size.

24. A system for a sample-analysis of data comprising a multitude of data packets, the system comprising:

a classification device classifying the data by classification rules into parent population flow groups, each parent population flow group representing a particular parent population number (N) of data packets, a sampling device setting of a particular sample number (n) for each of the particular parent population number (N) of data packets, the sampling device sampling sample-flow-groups (f1, f2, f3 . . .) with the corresponding sample number (n) of data packets from each of the particular parent population number (N) of data packets, wherein each sample-flow-group (f1, f2, f3 . . .) consists of a sample-flow-quantity ($n_{f1}$, $n_{f2}$, $n_{f3}$ . . .) of data packets that is equal to the respective sample number (n), a computing device determining sample-flow-mean-sizes ($\mu_{f1}$, $\mu_{f2}$, $\mu_{f3}$ . . .) defined by mean data size of the data packets in each sample-flow-group (f1, f2, f3 . . .), the computing device determining sample-flow-variances ($v_{f1}$, $v_{f2}$, $v_{f3}$ . . .) defined by a variance of data size of the data packets in each sample-flow-group (f1, f2, f3 . . .), determining sample-flow-ratios ($p_{f1}$, $p_{f2}$, $p_{f3}$ . . .) defined by the sample-flow-quantity ($n_{f1}$, $n_{f2}$, $n_{f3}$ . . .) in proportion to the sample number (n), the computing device calculating an estimated flow size ($Sum_f$) defined by an estimated sum of data sizes of data packages in a flow of a parent population number (N) of data packets, and the computing device calculating a variance ($V[Sum_f]$) of the estimated flow size ($Sum_f$), wherein for the calculating steps the parent population number (N), the sample number (n) and at least one of the sample-flow-ratios ($p_{f1}$, $p_{f2}$, $p_{f3}$ . . .), the sample-flow-mean-sizes ($\mu_{f1}$, $\mu_{f2}$, $\mu_{f3}$ . . .), and the sample-flow-variances ($v_{f1}$, $v_{f2}$, $v_{f3}$ . . .) are used, comprising the step of determining at least one of parent population flow-ratios ($P_{f1}$, $P_{f2}$, $P_{f3}$ . . .), parent population flow-mean-sizes ($M_{f1}$, $M_{f2}$, $M_{f3}$ . . .), and parent population flow-variances ($V_{f1}$, $V_{f2}$, $V_{f3}$ . . .) for each flow in the parent population number (N) of data packets, wherein for each sample-flow-group (f1, f2, f3 . . .) in a further step a sample-flow-size ($s_{f1}$, $s_{f2}$, $s_{f3}$ . . .), defined by a sum of bytes of the sample-flow-quantity ($n_{f1}$, $n_{f2}$, $n_{f3}$ . . .) of data packets, and a sample-square-sum ($sq_{f1}$, $sq_{f2}$, $sq_{f3}$ . . .), defined by summing up respective squared bytes of the sample-flow-quantity ($n_{f1}$, $n_{f2}$, $n_{f3}$ . . .) of data packets, are calculated, stored and updated, and wherein the parent population flow-variances ($V_{f1}$, $V_{f2}$, $V_{f3}$ . . .) are calculated using the sample-flow-size ($s_{f1}$, $s_{f2}$, $s_{f3}$ . . .) and the sample-square-sum ($sq_{f1}$, $sq_{f2}$, $sq_{f3}$ . . .) of a flow size in the formula $$V_f = \frac{1}{n_f}sq_f - \frac{1}{n_f^2}s_f^2$$

wherein $n_f$ denotes the sample-flow-quantities ($n_{f1}$, $n_{f2}$, $n_{f3}$ . . .) of data packets of a flow, $s_f$ denotes the sample-flow-size ($s_{f1}$, $s_{f2}$, $s_{f3}$ . . .) of a flow and $sq_f$ denotes the sample-square-sum ($sq_{f1}$, $sq_{f2}$, $sq_{f3}$ . . .) of the flow size.

* * * * *

UNITED STATES PATENT AND TRADEMARK OFFICE
CERTIFICATE OF CORRECTION

PATENT NO. : 8,045,470 B2  Page 1 of 1
APPLICATION NO. : 11/921367
DATED : October 25, 2011
INVENTOR(S) : Tanja Zseby It is certified that error appears in the above-identified patent and that said Letters Patent is hereby corrected as shown below:

Title Page of Patent, Column 1, Item (54), Line 3, delete "MULTITUTE" and insert -- MULTITUDE --

Column 1, Line 3, delete "MULTITUTE" and insert -- MULTITUDE --

Column 17, Line 22, Claim 1, delete "device the" and insert -- device of the --

Column 20, Line 20, Claim 10, delete "the determining" and insert -- determining --

Column 20, Line 67, Claim 17, delete "(f1, f1, f3...)" and insert -- (f1, f2, f3...) --

Signed and Sealed this
Thirteenth Day of March, 2012

David J. Kappos
*Director of the United States Patent and Trademark Office*